United States Patent
Kitamura

Patent Number: 5,850,763
Date of Patent: Dec. 22, 1998

[54] LENGTH ADJUSTING DEVICE FOR CONTROL CABLE

[75] Inventor: Yoshiharu Kitamura, Aikawa-machi, Japan

[73] Assignees: HNK Spring Co., Ltd., Yokohama; Uni-Flex, Inc., Ina, both of Japan

[21] Appl. No.: 906,755

[22] Filed: Aug. 6, 1997

Related U.S. Application Data

[62] Division of Ser. No. 674,751, Jul. 2, 1996, Pat. No. 5,706,706, which is a division of Ser. No. 422,303, Apr. 13, 1995, which is a division of Ser. No. 41,480, Apr. 2, 1993, Pat. No. 5,435,202.

[30] Foreign Application Priority Data

Apr. 5, 1992 [JP] Japan ................................. 49029310
Jul. 24, 1992 [JP] Japan ................................. 4-218405

[51] Int. Cl.$^6$ ........................................ F16C 1/10
[52] U.S. Cl. .................. 74/502.4; 74/502.6; 74/501.5 R
[58] Field of Search ........................... 74/500.5, 501.5 R, 74/502–502.6; 403/104, 106

[56] References Cited

U.S. PATENT DOCUMENTS

| | | | |
|---|---|---|---|
| 5,664,461 | 9/1997 | Kitamura | 74/502.6 X |
| 5,673,596 | 10/1997 | Lu | 74/502.4 |
| 5,682,797 | 11/1997 | Kelly et al. | 74/502.4 |

FOREIGN PATENT DOCUMENTS

| | | | |
|---|---|---|---|
| 0481588 A2 | 4/1992 | European Pat. Off. | 74/502.4 |
| WO 91/17365 | 11/1991 | WIPO | 74/502.4 |

*Primary Examiner*—Vinh T. Luong
*Attorney, Agent, or Firm*—Lackenbach Siegel Marzullo Aronson & Greenspan, PC

[57] ABSTRACT

A length-adjusting device for a control cable, comprising a stationary base member to which an outer cable or an inner cable of the control cable is fixedly secured, and into which a cylindrical adjusting pipe, having circular grooves formed and disposed thereon in parallel is inserted and movable in axial direction thereof; an adjusting piece, having a resilient spring, and having a pair of similarly pitched locking teeth for engagement to and release from the circular grooves, which is moveably inserted in a direction perpendicularly to the axis of the adjusting pipe and into an aperture in the stationary base member; and wherein the adjusting piece is biased by the resilient spring which is disposed between the stationary base member and the adjusting piece, for engaging the circular grooves with the locking teeth, and at the same time enabling the release of the engagement by movement against the resilient force of the resilient spring by means of an external force, and wherein the adjusting piece having opposing side plates is further provided with latching windows at their ends for engagement with corresponding latching elements provided on a pair of oppositely disposed side plates of the stationary base member.

1 Claim, 19 Drawing Sheets

F I G. 53
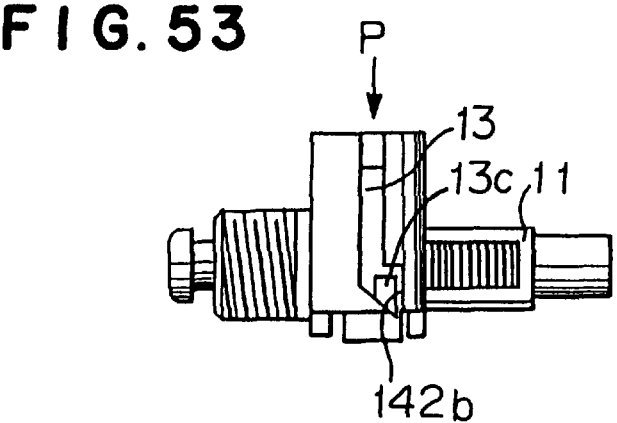
F I G. 54
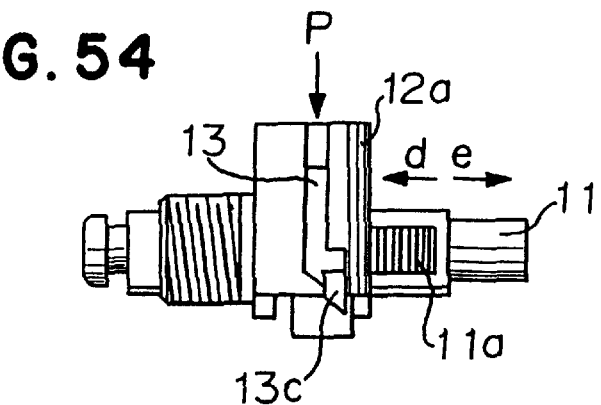
F I G. 55
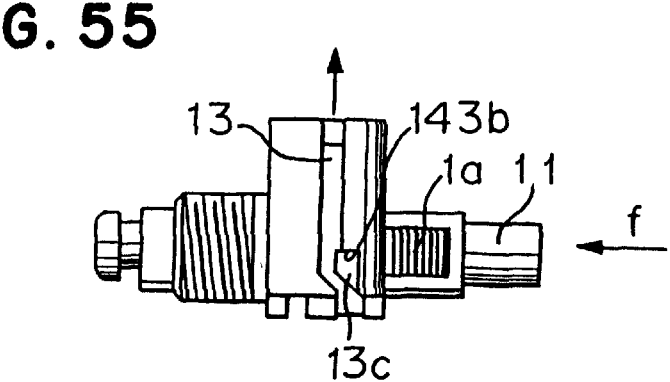
F I G. 56
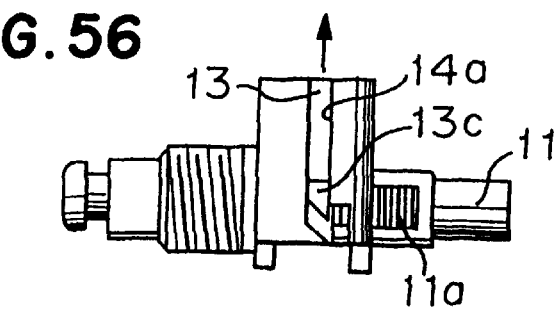

LENGTH ADJUSTING DEVICE FOR CONTROL CABLE

This is a division of application Ser. No. 08/674,751 filed Jul. 2, 1996, now U.S. Pat. No. 5,706,706, which in turn is a Div. of 08/422,303, filed Apr. 13, 1995, which in turn is a Div. of 08/041,480, filed Apr. 2, 1993, now U.S. Pat. No. 5,435,202, which in turn is a Div. of first filed patent U.S. case.

BACKGROUND OF THE INVENTION

The present invention relates to a length-adjusting device for a control cable for automobiles or the like.

Heretofore, such a device, as shown in FIG. 69, comprising an inner control cable (120) which is inserted through an outer cable (121), at the end of which an adjusting bolt (122) is secured, said adjusting bolt (122) being inserted into a fixing hole of a stationary member (123), is fixed by means of screwing two adjusting nuts (124), which are engaged with said adjusting bolt (122), from both sides of said stationary member (123) respectively, has been generally used for said purpose. In order to adjust the cable length in such a device, however, said adjusting nuts (124) must be first loosened, then fastened again after adjusting the cable length, which requires additional work and time.

For overcoming such deficiencies, devices such as Jpn. Publication S62-63212 (Type 1) and Jpn. Utility Model Publication S51-10269 (Type 2, corresponding to U.S. Pat. No. 3,572,159) were disclosed.

Namely, in said Type 1, a latch member is movably installed rectangularly to said inner cable axis and spring-biased to latch with a sliding member integral to said inner cable. Cable length can be adjusted by moving said latch member against the resilient force of said spring; then, said inner cable can be locked by securing said latch member to said sliding member due to release from said enforced movement.

However, in said Type 1, the size of the adjusting member necessarily becomes larger and, moreover, secure locking cannot be achieved, because the latching direction is rectangular to said sliding member, and is jeopardized by accidents occurring if the adjusted position moves when said cable is subjected to a great outer force.

Further, in said Type 2, an adjusting device comprises a fixed outer cable (a conduit), and an adjusting pipe (an adjusting member) therethrough penetrating an inner cable (a motion transmitting core element), a base member (a support member) inserted axial-movably into said adjusting pipe and an adjusting piece (a locking member) is installed within said base member so as to slide rectangularly to the axial direction.

And, said locking member is threaded so as to engage with the outer thread of said adjusting pipe. Thus, said locking member comprises a small-diametered circular hole to be threaded as aforementioned, and a large-diameter circular hole to be continuously connected with said small one.

However, in said Type 2, the formation of two types of holes, i.e., the small-diametered and the large-diametered, will inevitably enlarge the size of said locking member and, further, since said adjusting pipe is moved relative to said base member by means of moving said locking member over said two types of holes, the operational stroke of said locking member must be large, which results in applicability within a comparatively small space. Moreover, such a screw-threaded engagement may occasionally cause an adverse function or problem.

SUMMARY OF THE INVENTION

The present invention aims to provide a length-adjusting device for a control cable which is compact but able to be securely locked and is, moreover, easily assembled, overcoming the drawbacks intrinsic to any prior art as aforementioned.

In the present invention, for attaining these objects, either an outer cable or an inner cable is fixed, and an adjusting pipe, having latching teeth formed outside thereto, is inserted movably in the axial direction into a stationary base member and, further, an adjusting piece, with parallel locking teeth to be engaged with said latching teeth, is movably inserted, perpendicularly to the axis of said adjusting pipe, into said stationary base member.

In this case, said outer cable may be fixed to said adjusting pipe and said inner cable may be inserted through said adjusting pipe or, otherwise, said outer cable may be fixed to said stationary bracket with said inner cable being secured to said adjusting cable.

Further, said adjusting piece may be assembled in said base member so as to regulate the range of movement of said adjusting pipe by means of abutting to both side ends of a concave surface which is formed on the outside of said adjusting pipe wherein said latching teeth are formed axially-continuously with said concave surface.

Further, a guide groove comprising a straight groove and a slant groove continuously connected to each other may be formed in said base member for guiding the movement of said adjusting piece.

Furthermore, the length of said latching teeth rectangular to the axis of said adjusting pipe may be shortened and said teeth may be arranged in parallel in the axial direction of said adjusting pipe, and at the same time, said locking teeth may be arranged in parallel corresponding to the length of said latching teeth.

Moreover, said latching teeth may be formed with circular grooves formed around the circumference of said adjusting pipe.

Besides, a resilient spring, installed between said adjusting pipe and said base member, may be provided to bias said adjusting pipe to one side of said concave. Said adjusting piece can be maintained with said latching teeth being engaged with said locking teeth due to the resilient force of a spring provided between said base member and said adjusting piece, and can be installed so as to release said engagement due to the movement of said adjusting piece against the resilient force of said spring. Further, said latching teeth and corresponding locking teeth may both be formed obliquely to the axial direction of said adjusting pipe, on said adjusting pipe and adjusting piece, respectively.

Because of the above-mentioned structures, said parallel latching teeth and said parallel locking teeth engage each other. This will eliminate any adverse engaging, resulting in secure locking of the movement of said adjusting pipe. Further, since said latching teeth are formed outside said adjusting pipe, the length of said teeth becomes less than the diameter of said adjusting pipe and, as a result, the operational stroke of said adjusting piece becomes small.

When said outer cable is fixed to said adjusting pipe, the length of said inner cable is indirectly adjusted relative to said outer cable and contrarily, when an inner cable is fixed to said adjusting pipe, the length of said inner cable is adjusted directly.

Further, said adjusting piece is inserted into said base member after said adjusting pipe is penetrated through said base member, which will prevent sliding-off of said adjusting pipe by restraining the movement of said adjusting pipe within said concave formed outside said adjusting pipe.

Further, when sliding said adjusting piece along said guide groove on said base member, at first, the straining position of said cable is decided by moving said adjusting pipe. Then, straining state is attained once by locking the movement of said adjusting pipe by moving said adjusting piece along said straight groove, and then, the further movement of said adjusting piece is exerted by moving said adjusting piece along said slant groove in the axial direction of said adjusting pipe, or by moving both adjusting pipe and said adjusting piece simultaneously. In this case, said cable slackens by moving said adjusting pipe in the axial direction, locking said adjusting pipe at this slackened position.

When disposing said latching teeth and locking teeth in parallel, shortening the teeth thereof, operational strokes can be decreased. Further, the twisting of said cable can be eliminated by forming said latching teeth with circular grooves which will make said adjusting pipe rotatable even when locked.

Besides, a resilient force can be used for relative moving between said base member and said adjusting pipe, under releasing engagement between said latching teeth and said locking teeth, if said resilient spring is provided for biasing said adjusting pipe.

When installing a resilient spring, said adjusting pipe can be moved by the movement of said adjusting piece caused by said spring, and said adjusting pipe can be locked by moving said adjusting piece against the resilient force of said spring. And, when latching teeth and locking teeth are both formed declining to the axial direction of said adjusting pipe, said cable can be locked in a somewhat slackened state because said adjusting pipe will axially move when said adjusting piece is moved rectangularly to the axial direction of said adjusting pipe.

BRIEF DESCRIPTION OF THE DRAWINGS

FIG. 53 is a front view to explain the functions of the embodiment in FIG. 40.

FIG. 54 is a front view to explain the functions of the embodiment in FIG. 40.

FIG. 55 is a front view to explain the functions of the embodiment in FIG. 40.

FIG. 56 is a front view to explain the functions of the embodiment in FIG. 40.

DETAILED DESCRIPTION OF THE INVENTION

FIGS. 1 through 16 denote the 1st embodiment, i.e., Device A, according to the present invention.

As shown in FIGS. 1 through 5, said device A comprises an adjusting pipe (1), an outer cable a secured thereto and an inner cable b inserted therethrough, a base member (2) which is fixed to a stationary member through a bracket or the like after being inserted through said adjusting pipe (1), and an adjusting piece installed slidably within said base member (2) in the direction rectangular to the axial direction of said adjusting pipe.

Figure 8:
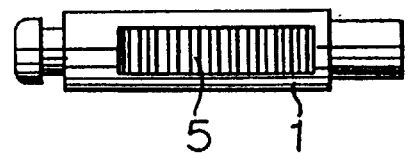
FIG. 8 is a plan view of an adjusting pipe of FIG. 2.
Figure 9:
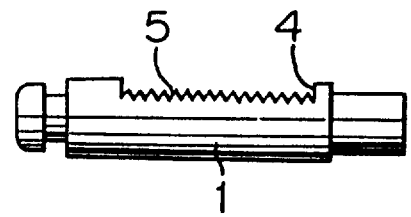
FIG. 9 is a front view of FIG. 8.

Said adjusting pipe (1), as shown in FIGS. 8 and 9, comprises a concave (4) formed on one side of the circumference of said pipe (1) along the axis thereof, at the bottom of which latching teeth (5) are formed rectangularly to the axis thereof.

Figure 1:
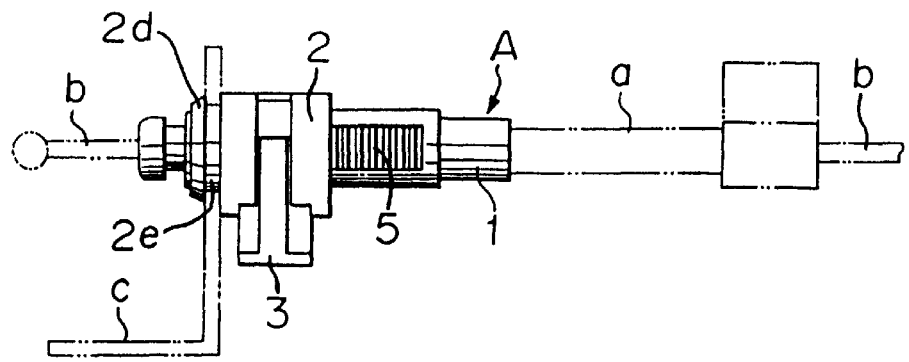
FIG. 1 is a plan view of the 1st embodiment of the present invention.
Figure 2:
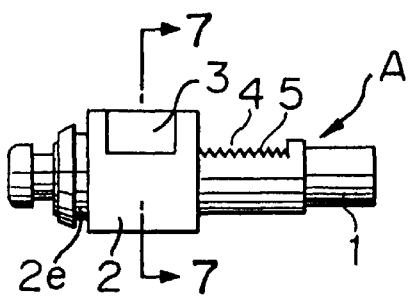
FIG. 2 is a front view of said 1st embodiment.
Figure 3:
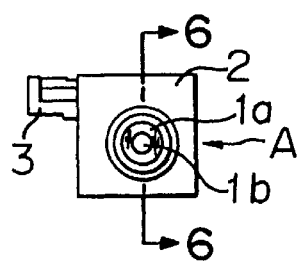
FIG. 3 is a right-side view of FIG. 2.
Figure 4:
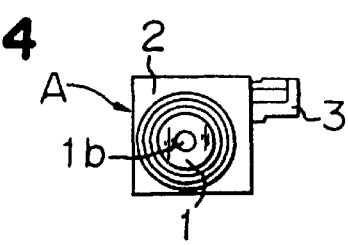
FIG. 4 is a left-side view of FIG. 2.
Figure 5:
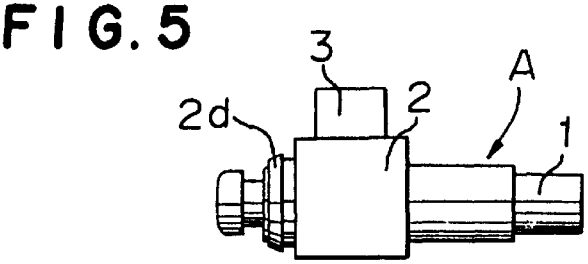
FIG. 5 is a bottom view of said 1st embodiment.
Figure 6:
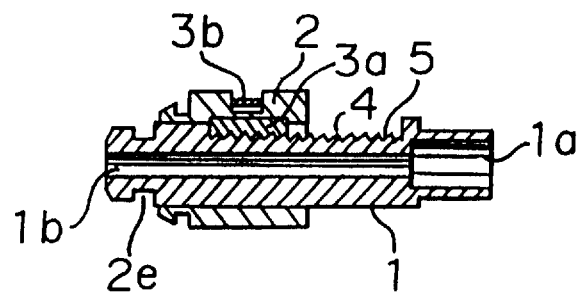
FIG. 6 is a sectional view along line 6—6 of FIG. 3.
Figure 7:
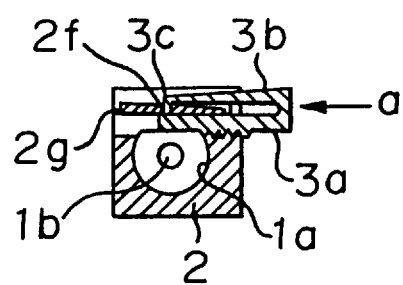
FIG. 7 is a sectional view along line 7—7 of FIG. 2.

A stepped penetrating hole, wherein a large diametered hole (1a) is continuously connected with a small diametered hole (1b), is, as shown in FIG. 6, formed around the axial core of said adjusting pipe (1), fixing an outer cable a to said large diametered hole (1a) and insert an inner cable b through said small diametered hole (1b).

Figure 10:
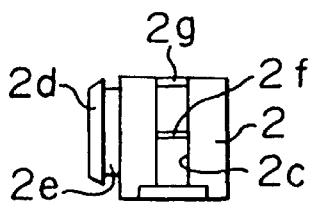
FIG. 10 is a front view of a base member in FIG. 2.
Figure 11:
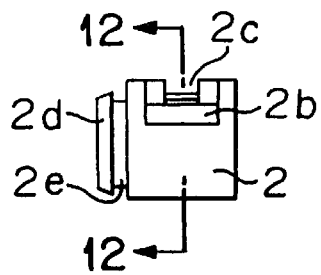
FIG. 11 is a front view of FIG. 10.
Figure 12:
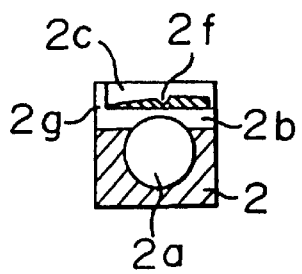
FIG. 12 is a sectional view along line 12—12 in FIG. 11.
Figure 13:
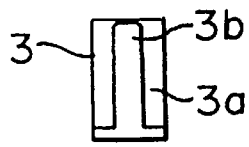
FIG. 13 is a plan view of an adjusting piece in FIG. 2.
Figure 14:
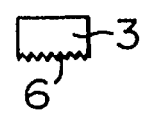
FIG. 14 is a front view of FIG. 13.
Figure 15:
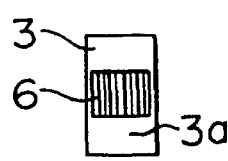
FIG. 15 is a bottom view of FIG. 13.
Figure 16:
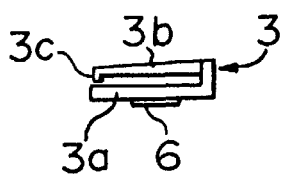
FIG. 16 is a side view of FIG. 13.

A base member (2), comprised as shown in FIGS. 10 through 12, is a cubic block-like matter, with a circular penetrating hole (2a) formed around the center thereof for said adjusting pipe (1).

In said base member (2), a rectangular penetrating hole (26) for the main portion (3a) of an adjusting piece (3) is formed at a position separate from the axis core of said circular penetrating hole (2a) rectangularly to said axis core, and a latching groove (2c) to receive a snap tab (3b) of said adjusting piece (3) is formed on the upper face of the upper partition board of said rectangular penetrating hole (2b). Further, at the bottom of said latching groove (2c), latching concaves (2f, 2g) to engage with said snap tab (3b) are formed.

Further, a cylindrical portion (2d), having said circular penetrating hole (2a), is formed on one side of said base member (2), and a circular groove (2e), to which an adequate flange member is engaged, is formed in said cylindrical portion (2d) for fixing onto a stationary member.

Still further, as shown in FIGS. 13 through 16, said adjusting piece is bent into a figure with one of the opposing sides made to be said main portion (3a), with the other being said snap tab (3b). Locking teeth (6) with the same pitches as said latching teeth (5) of said adjusting pipe (1) are formed on the lower face of said main portion (3a), and a latchet (3c) is formed at the end of said snap tab (3b). Said latchet (3c) is provided to secure said adjusting piece (3) to said base member (2) by engaging with said latching concaves (2f, 2g) of said base member (2) when inserting said main portion (3) into said penetrating hole (2b) of said base member (2).

In Device A, said outer cable a is fixed and, after said adjusting pipe (1), through which said inner cable b is inserted, is penetrated into said base member (2), said adjusting piece (3) is inserted into said base member (2). In this case, said latchet (3c) is engaged with said latching concave (2f) (refer to FIG. 7). According to these disposals, said base member (2) becomes movable relative to said adjusting pipe (1) within said concave (4) and at the same time, slippage from said adjusting pipe (1) can be prevented.

In those situations, said base member (2) is fixed to a stationary member; then, after adjusting the length of a control cable (not drawn) by moving said adjusting pipe (1), said adjusting piece (3) is inserted in direction "a" (refer to FIG. 7), so as to lock the movement of said adjusting pipe (1) by engaging said locking teeth (6) with said latching teeth (5). In this case, said adjusting piece (3) is held, with said latchet (3c) thereof being engaged with said latching concave (2g).

The 2nd embodiment of the present invention, i.e., Device B is shown in FIGS. 17 through 32,. Said Device B comprises an adjusting pipe (10), functions the same as said Device A, a base member (20) and an adjusting piece (30).

Figure 25:
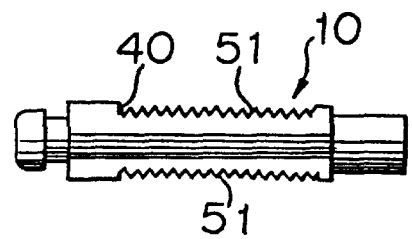
FIG. 25 is a plan view of an adjusting pipe in FIG. 18.
Figure 26:
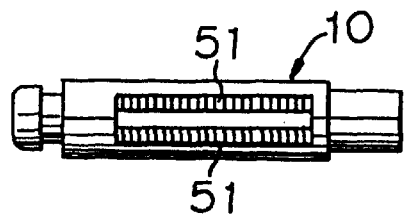
FIG. 26 is a front view of FIG. 25.

As shown in FIGS. 25 and 26 a pair, of latching teeth (51, 51) with short lengths thereof perpendicularly to the axial direction of said adjusting pipe, is installed on both outer sides of said adjusting pipe (10).

Figure 27:
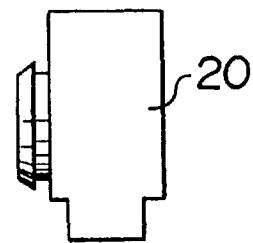
FIG. 27 is a front view of a base member in FIG. 18.
Figure 28:
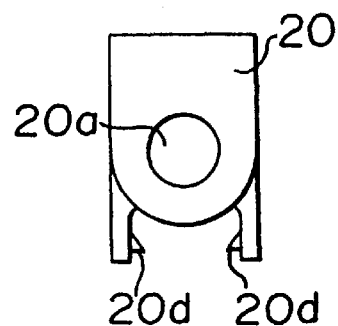
FIG. 28 is a side view of FIG. 27.

Said base member (20) is, as shown in FIGS. 27 and 28, formed rectangularly cylindric, with a pair of penetrating holes (20a) to receive said adjusting pipe (10) provided on the opposing sides thereof. Within said base member (20) a spring seat (20c) is formed, the ends of which are connected to said opposing sides (refer to FIGS. 22, 23 and 24). Other opposing sides of said base member (20) are elongated whereon a pair of latchets (20d) is formed.

Figure 29:
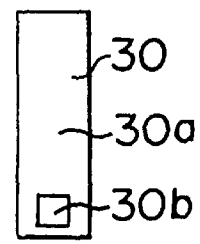
FIG. 29 is a front view of an adjusting piece in FIG. 18.
Figure 30:
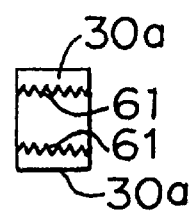
FIG. 30 is a bottom view of FIG. 2 9.
Figure 31:
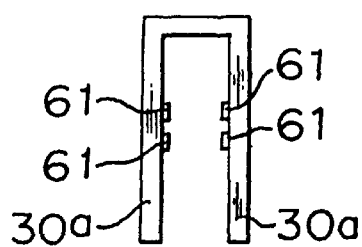
FIG. 31 is a side view of FIG. 29.
Figure 32:
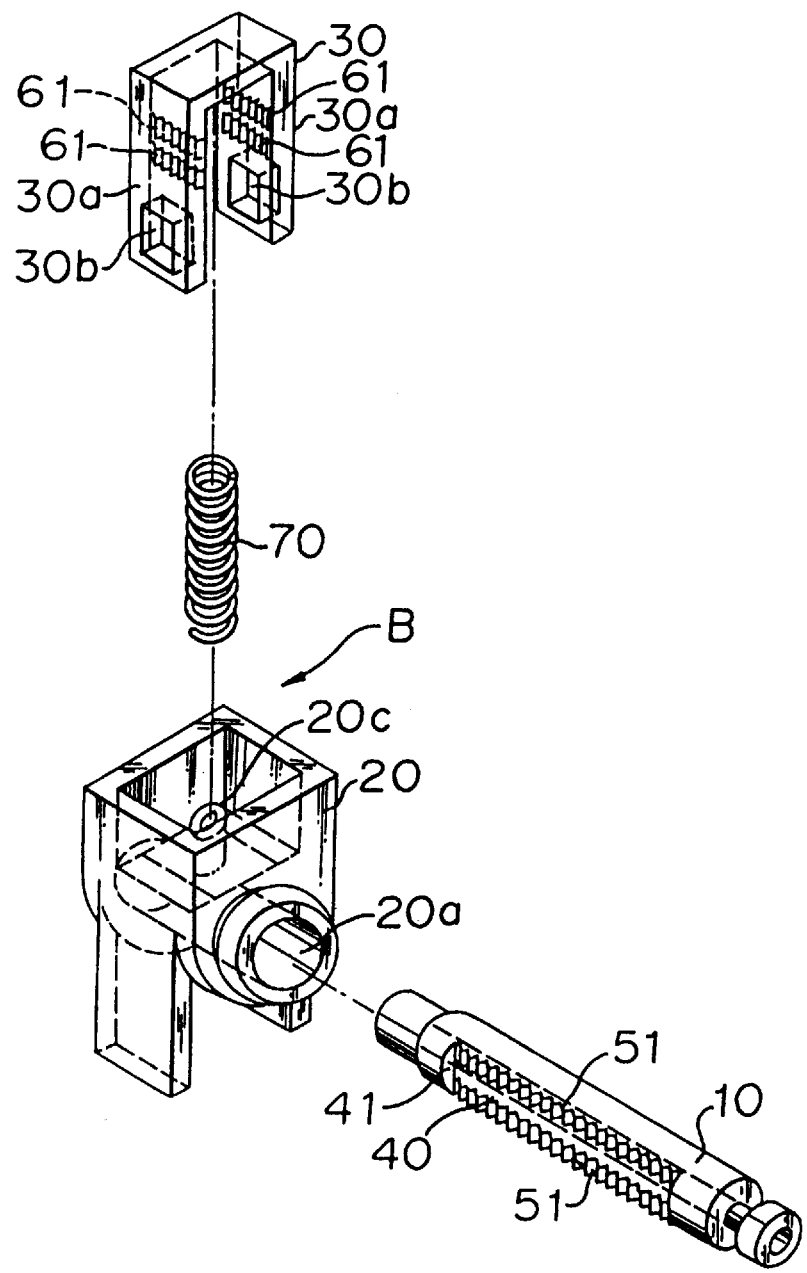
FIG. 32 is an exploded perspective view of the 2nd embodiment of the present invention.

As shown in FIGS. 29 through 31, an adjusting piece (30) is bent in a ]-form with both opposing side plates (30a) provided at the ends thereof, with latching windows (30b) to engage with said latchets (20d) being formed and, nearly at the center of said opposing sides, a pair of locking teeth, having the same tooth lengths and intervals as said latching teeth 5, is provided in parallel.

Figure 17:
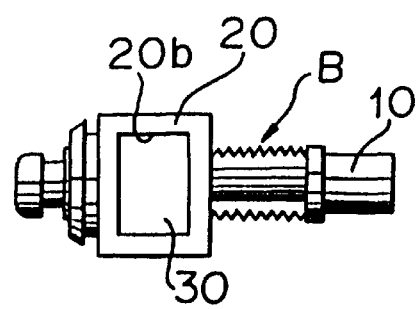
FIG. 17 is a plan view of the 2nd embodiment of the present invention.
Figure 18:
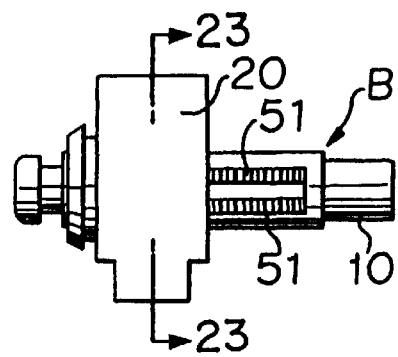
FIG. 18 is a front view of FIG. 17.
Figure 19:
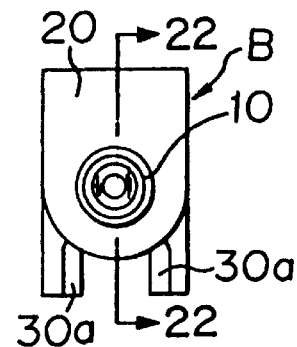
FIG. 19 is a right-side view of FIG. 18.
Figure 20:
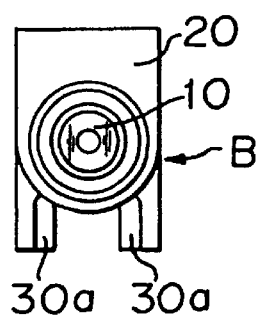
FIG. 20 is a left-side view of FIG. 18.
Figure 21:
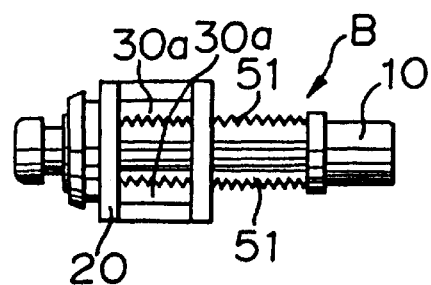
FIG. 21 is a bottom view of FIG. 18.

These elements are assembled as follows:

First, an outer cable of the control cable is fixed, then, after inserting said adjusting pipe (10), through which an inner cable is inserted, into said base member (20), said adjusting piece (30) is inserted into a rectangular hole (20b) of said base member (20) so as to position said side plates (30a) at both sides of said adjusting pipe (10) (refer to FIG. 17). Said adjusting piece (30) contains a spring (70), the end of which is supported by said spring seat (20c), when being thus inserted, and after, said spring (70) will bias said adjusting piece (30) in direction "b" (refer to FIG. 22).

Figure 22:
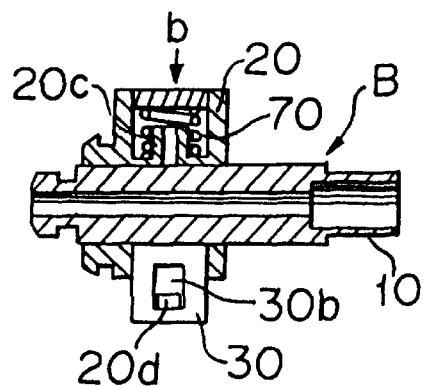
FIG. 22 is a sectional view along line 22—22 in FIG. 19.
Figure 23:
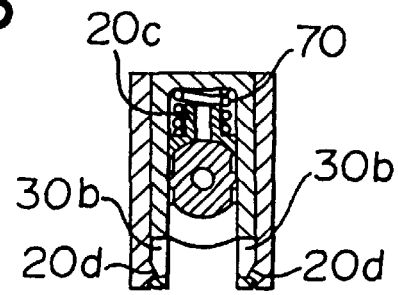
FIG. 23 is a sectional view along line 23—23 in FIG. 18.

In this state, since said latching window (30b) of said adjusting piece is engaged with said latchet (20d), the slippage of said adjusting piece (30) is restricted from said base member (20) despite said spring (70) being energized or biased (refer to FIGS. 22 and 23).

Functions of said Device B are as follows: When said adjusting piece (30) is inserted, the movement of said base member (20) relative to said adjusting pipe (10) is locked because said locking teeth (61) are engaged with said latching teeth (51) of said adjusting pipe (10) (refer to FIG. 23).

Figure 24:
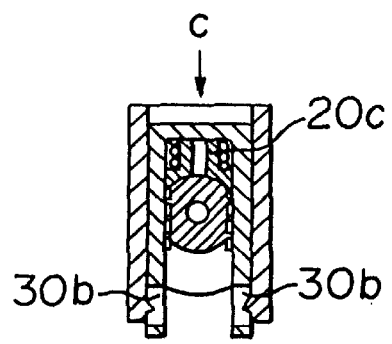
FIG. 24 is a sectional view showing the state after FIG. 23 functioned.

In such a state, when moving said adjusting piece (30), as shown in FIG. 24, down in direction "c", said locking teeth (61) will be free from said latching teeth 51, making the movement range of said base member (20) relative to said, adjusting pipe (10) restricted by a concave (40) of said adjusting pipe (10) resulting in attaining of length adjusting within the extent as mentioned above.

Thus, in said Device B, the operational stroke is small, leading to less assembly space because said operation is exerted by engaging and releasing between said latching teeth (51) and said locking teeth (61) both of which have short teeth.

Figure 33:
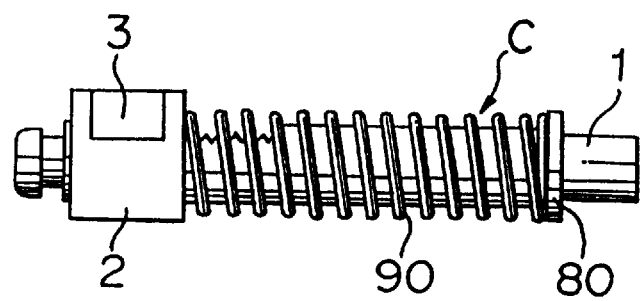
FIG. 33 is a front view of the 3rd embodiment of the present invention.

FIG. 33 shows Device C, i.e., the 3rd embodiment of the present invention. Said Device C is modified from said Device A, with the length of the adjusting pipe (1) being longer, a flange portion (80) installed to said adjusting pipe (1), a spring (90) extrapolated at the portion of said adjusting pipe (1) between a base member (2) and said flange portion (80) and said base member (20) is bias-urged to the one side of a concave (4) formed in said adjusting pipe (1). Structures other than the above-mentioned are similar to those in Device A.

In Device C, the resilient force of said spring (60) is utilized for length-adjusting a control cable.

Figure 34:
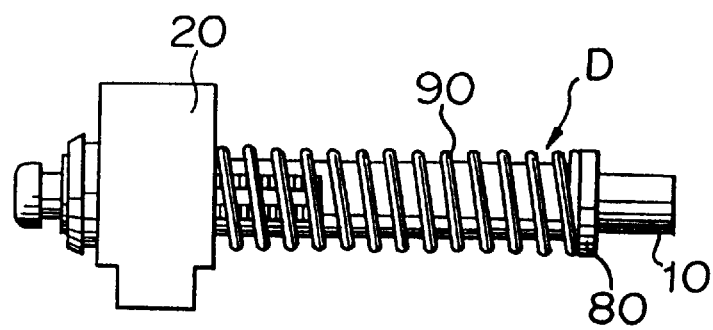
FIG. 34 is a front view of the 4th embodiment of the present invention.

In FIG. 34, Device D, i.e., the 4th embodiment of the present invention is shown. Said Device D is a deviation of said Device B, with the length of the adjusting pipe (10) being longer. In said Device D, said adjusting pipe has a flange portion (80), a spring (90) extrapolated on the portion of said adjusting pipe (10) between said base member (20) and said flange portion and said base member (20) are bias-urged by said spring (90) to the one side of a concave (4) formed in said adjusting pipe (10). All of the elements and structures other than those mentioned above are similar to those in said Device B.

In Device D, the resilient force of said spring (90) can be made use of for adjusting the length of a control cable, as is the case with said Device C.

Figure 35:
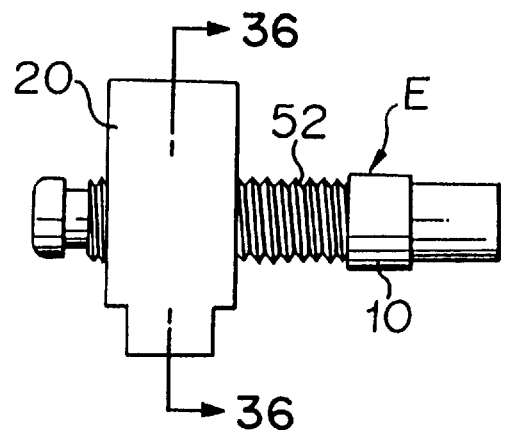
FIG. 35 is a front view of the 5th embodiment of the present invention.
Figure 36:
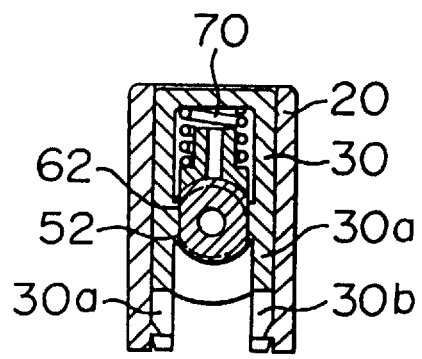
FIG. 36 is a sectional view along line 36—36 in FIG. 35.
Figure 37:
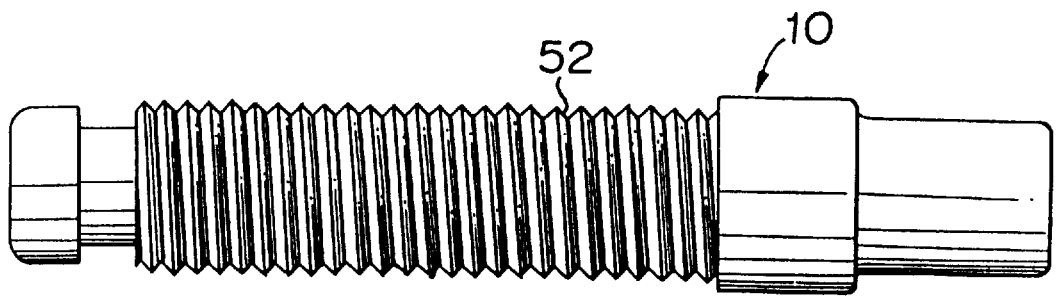
FIG. 37 is an enlarged front view of an adjusting pipe in FIG. 35.

FIGS. 35 through 37 show Device E, i.e., the 5th embodiment of the present invention. Said device is a modification of said Device B, wherein latching teeth (52), comprising circular grooves, are formulated around said adjusting pipe (10) and, at about the center portion of the opposing surfaces of both of sides (30a) locking teeth (62) are provided to engage with said latching teeth (52). As to other structures, said Device E is similar to said Device B.

According to Device E, said adjusting pipe (10) is pivotable around the axis even when the axial movement of said pipe (10) is locked by the engagement between said latching teeth (52) and said locking teeth (62). Because of said pivotable feature of said adjusting pipe (10), cable twisting can be eliminated.

Figure 38:
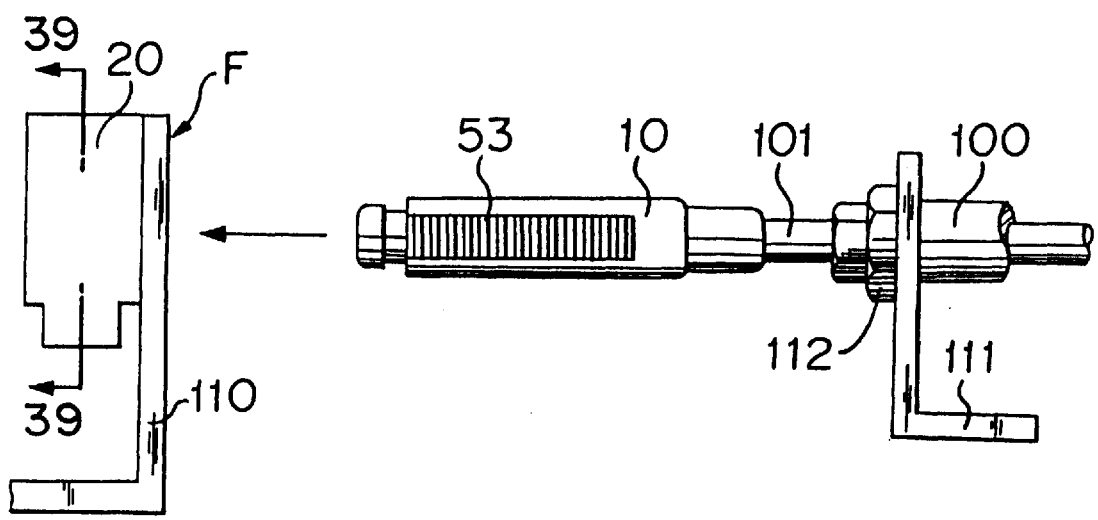
FIG. 38 is an exploded front view of the 6th embodiment of the present invention.
Figure 39:
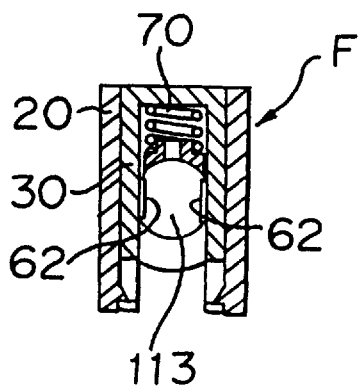
FIG. 39 is a sectional view along line VII—VII in FIG. 38.

FIGS. 38 and 39 show Device F. i.e . . . the 6th embodiment of the present invention. Similar to said Device E, Device F comprises a base member (20), a ] figure-shaped adjusting piece (30), opposing side plates (30a) on which locking teeth (62) are provided and a resilient spring (70) (refer to FIG. 38), wherein said base member (20) is secured to a stationary bracket (110).

Further, an inner cable (101) of a control cable is secured to an adjusting pipe (10) and an outer cable (100) is fixed to another stationary bracket (111) by means of a nut. Concaves are axially formed on both sides of the circumference of said adjusting pipe and, within said concaves, latching teeth are formed. Said adjusting pipe is inserted into a penetrating hole (113) of said Device F, and locking teeth (6) are engaged with said latching teeth (53) so as to lock the axial movement of said adjusting pipe (10).

According to said Device F, therefore, the length of said inner cable (101) can be adjusted directly. In addition, said adjusting pipe may be made of a solid material. Since extreme tension of the cable is not necessarily preferable, retaining the same in a slightly slackened (about several mm) state, after full tensioning thereof, is preferable. The reason for the above is that a fully tensioned state may result in oversensitive functions when subjected to only slight external forces, resulting in adverse effects on safety, operation and sensation, particularly for an automobile accelerating cable, a trunk-opener cable or the like.

Embodiments of the present invention which are capable of easily performing said adjusting in one action, are described below:

FIGS. 40 through 56 show Adjusting Device G, i.e., the 7th embodiment of the present invention.

Said Adjusting Device G comprises an adjusting pipe (11) to which an outer cable is fixed and through which an inner cable is penetrated, a base member (12) which is extrapolated on said adjusting pipe (11) and secured to a stationary member through a bracket or the like, and an adjusting piece inserted pivotally and rectangularly to the axial direction of said adjusting pipe, into said base member,(12).

Figure 40:
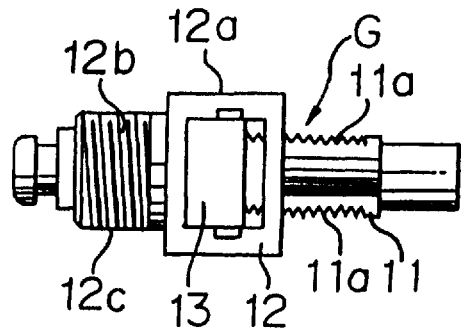
FIG. 40 is a plan view of the 7th embodiment of the present invention.
Figure 41:
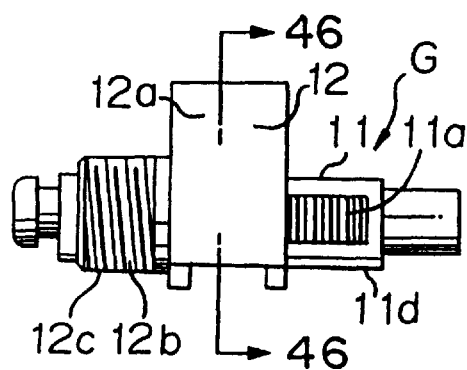
FIG. 41 is a front view of FIG. 40.
Figure 42:
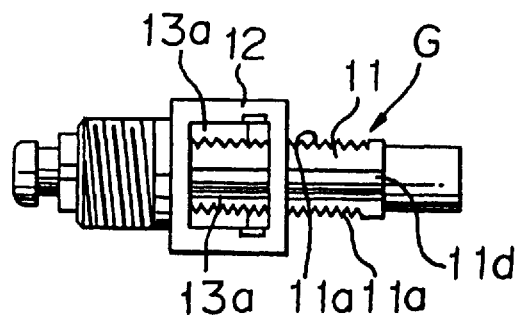
FIG. 42 is a bottom view of FIG. 40.
Figure 43:
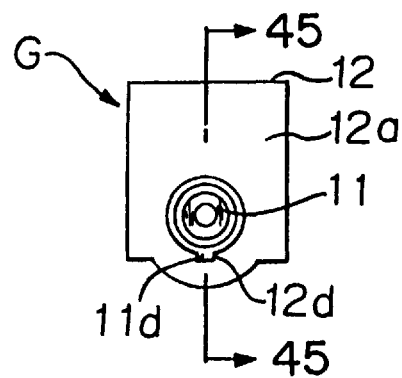
FIG. 43 is a right-side view of FIG. 41.
Figure 44:
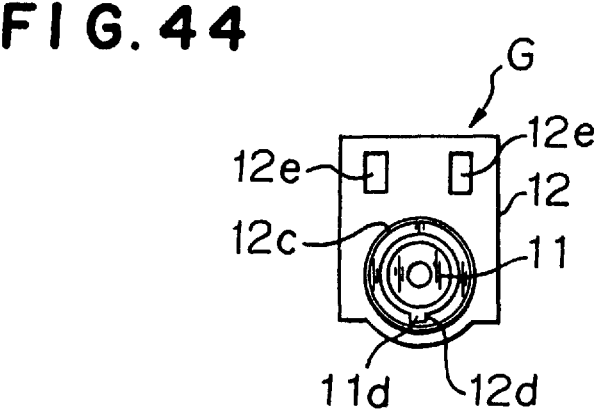
FIG. 44 is a left-side view of FIG. 40.

Said adjusting pipe (11), as shown in FIGS. 40, 41 and 44, forms a circular column, with latching teeth (11a) and (11a) disposed on the plain surface at both ends of said column.

A penetrating hole (11b) for said inner cable is formed along the axis of said adjusting pipe, said penetrating hole forming a large-diametered hole (11c) to secure said outer cable.

A rib (11d) is formed outside along the axial direction of said adjusting pipe (11). Said base member (12) comprises a rectangularly cylindrical portion (12a) and a circular column portion (12b), which are continuously formed and through both of which a penetrating hole to receive said adjusting pipe (11) slidably. Further, screw threads (12c) are formed around said circular column 12b (refer to FIGS. 40 and 41), with which a nut (not shown) engages to fix said base member (12) to said stationary member.

In said penetrating hole of said base member (12) is formed a groove (12d) to be engaged with said rib (11d) of said adjusting pipe (11) (refer to FIG. 43 and 44), by means of which said adjusting pipe (11) is installed movably only along the axial direction thereof to said base member (12) resulting in ease of positioning said adjusting pipe (11) relative to said base member (12) during assembly.

Further, rectangular windows (12e) and (12e) are bored on one side of said rectangular cylindrical portion (12a) of said base member (12) (refer to FIG. 44).

Figure 48:
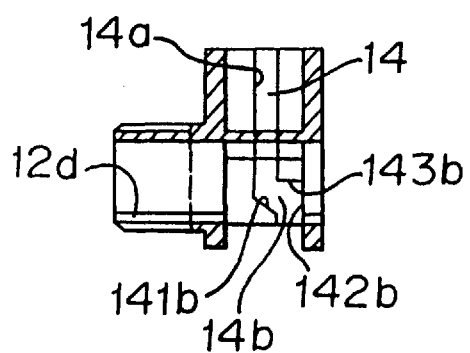
FIG. 48 is a sectional view along line 48—48 in FIG. 47.
Figure 49:
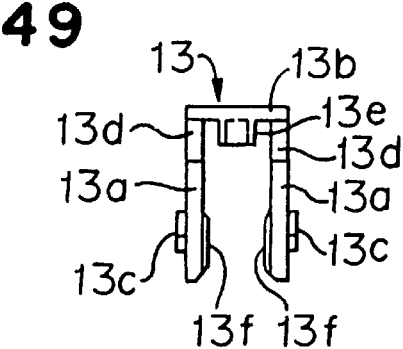
FIG. 49 is a front view of an adjusting piece in FIG. 40.
Figure 50:
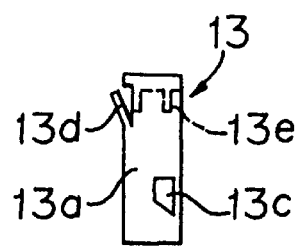
FIG. 50 is a side view of FIG. 49.

As shown in FIGS. 48 and 49, said adjusting piece is formed into a π-figure, each side plate of which is (13a) and (13a), i.e . . . , the opposing sides, and (13b), the upper one, and projections (13c and 13c) are made outside said side plates (13a and 13a), respectively, and locking teeth (13f and 13f) are formed inside said plates (13a and 13a), respectively. Further, tongues (13d and 13d), bent upward, are formed on both edge portions of said opposing side plates (13a and 13a), and a projection (13e) is formed on the lower surface of said upper side plate (13b). Then, the lower surface of said projection (13c) is a declined plate, with the upper surface being a horizontal plate. Said adjusting piece (13) is inserted into said rectangular cylindrical portion (12a) of said,base member (12) so as to be rectangularly movable to said adjusting pipe (11), wherein said opposing sides (13a and 13a) of said adjusting piece (13) will clamp both sides of said adjusting pipe (11).

Insertion of said adjusting piece (13) into said rectangular cylindrical portion (12a) is guided by guiding grooves (14) formed on the interior sides thereof, wherein a straight groove (14a) which guides said adjusting piece (13) vertically within said rectangular cylindrical portion (12a), and a declined groove (14b) which guides said adjusting piece (13) along the axis of said adjusting pipe (11) are continuously connected on the opposing walls of said rectangular cylindrical portion (12a).

Figure 45:
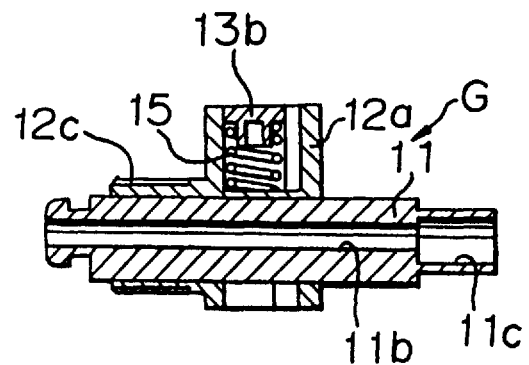
FIG. 45 is a sectional view along line 45—45 in FIG. 43.

Said adjusting piece (13) is inserted into said rectangular cylindrical portion (12a) with its projection (13c) being fixed with said guide groove 14. As shown in FIG. 45, between said upper plate (13) of said adjusting piece (13) and a partition wall (12f) formed midway within said rectangular cylindrical portion (12a) a coil spring is provided so as to bias said adjusting piece upwards, wherein said projection (13e) on the upper plate (13b) is fixed into said spring (15) to prevent the buckling thereof.

Said adjusting piece (13) is restrained from sliding off upwards despite the resilient force of said spring (15) because said tongue (13d) thereof is latched at said rectangular window (12e) of said rectangular cylindrical portion (12a).

Figure 46:
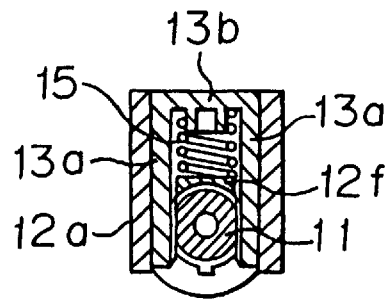
FIG. 46 is a sectional view along line 46—46 in FIG. 41.
Figure 47:
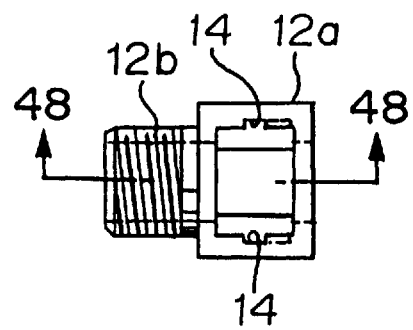
FIG. 47 is a plan view of a base member in FIG. 40.
Figure 51:
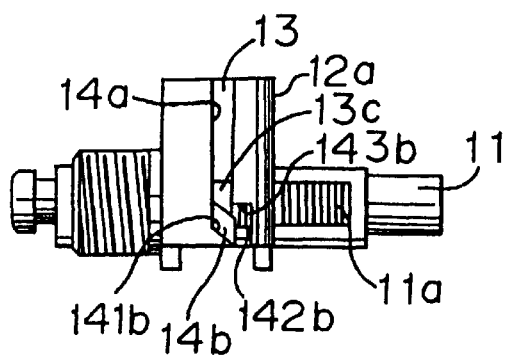
FIG. 51 is a front view to explain the functions of the embodiment in FIG. 40.

Said Adjusting Device G, when thus assembled, will function as follows:

The initial state directly after said adjusting piece (13) has been assembled within said rectangular cylindrical portion (12a) is as shown in FIGS. 46 and 51. In this state, said locking teeth 13f of said adjusting piece (13) are engaged with said latching teeth 11a of said adjusting pipe (11) (FIG. 46), and said projection (13c) is positioned underside straight groove (14a) (FIG. 51), and thus the axial movement of said adjusting pipe (11) is locked.

Figure 52:
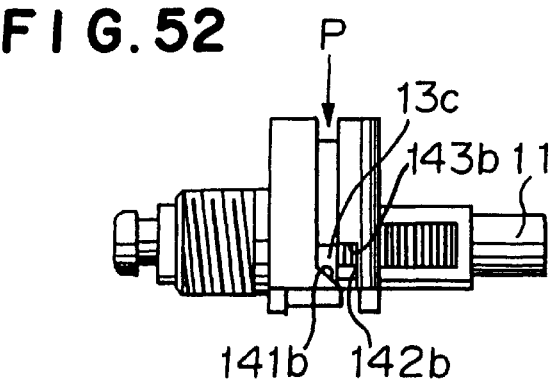
FIG. 52 is a front view to explain the functions of the embodiment in FIG. 40.

Then, when load P is applied to said adjusting piece (13) downwards, said adjusting piece (13) falls guided by said straight groove (14a) down to abutting said declined face of said projection (13c) to a declined face (141b) of said declined groove (14b) (refer to FIG. 52). In this case, said declined groove (14b) consists of said declined face (141b), a horizontal face (143b) opposing said declined face (141b) and a vertical face (142b) hanging down from said horizontal face (143b) (refer to FIG. 48). Further, when said downward load P is increased, said projection (13c) moves along said declined face (141b) down to abut said vertical face (142b) and thus, said adjusting piece (13) will fall down along the axial direction of said adjusting pipe (11) (refer to FIG. 53).

When said downward load P is further applied, said projection 13(c) descends along with said vertical face (142b) together with said adjusting piece (13) (FIG. 53). In this state, said locking teeth (13f) of said adjusting piece (13) are released from engagement with the latching teeth (11a) of said adjusting pipe, and thus, said adjusting pipe (11) becomes free to move in axial direction thereof, i.e., in direction "d" or direction "e" in FIG. 54. Maintaining this state, the length of the cable can be adequately adjusted by moving said adjusting pipe (11).

After adjusting, when releasing said load P, said adjusting piece (13) rises due to said spring (15) up to abut said projection (13c) to said horizontal face (143b) of said declined groove (14b) (refer to FIG. 55). In this state, a temporary stress of said cable is obtained because said locking teeth (13f)of said adjusting piece are engaged with said latching teeth (11a) of said adjusting pipe (11) so that the axial movement thereof is locked.

Next, as shown in FIG. 55, moving said adjusting pipe (11) in direction "f" will make said adjusting piece (13) move also, and eventually such an initial locking state as shown in FIG. 46 is attained, because abutting said projection (13c) to said horizontal face (143b) is released and then said adjusting piece (13) will ascend along said straight groove (14a) (refer to FIG. 56). The cable then slackens corresponding to the movement of said adjusting pipe (11) in direction "f".

Figure 57:
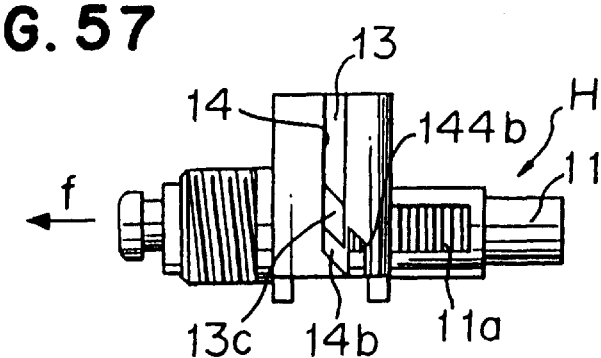
FIG. 57 is a front view of the 8th embodiment of the present invention.
Figure 58:
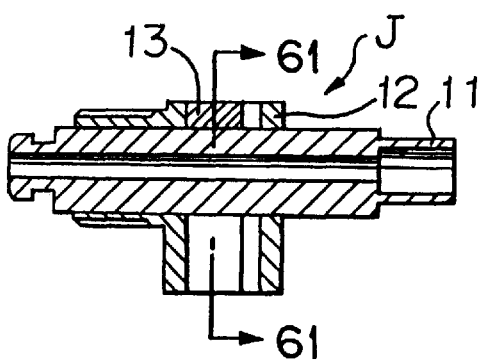
FIG. 58 is a longitudinally sectional view of the 9th embodiment of the present invention.
Figure 59:
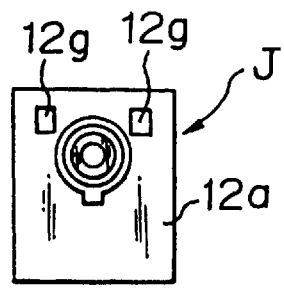
FIG. 59 is a right-side view of FIG. 58.

FIG. 57 shows Device H, which is the 8th embodiment of the present invention. Said Device H comprises structures similar to said Device G except for the forms of said projection (13) and said declined groove (14b) of said guide groove (14).

In said Device H, a nearly lozenge-shaped projection (13c) is provided, and said declined groove has an upwards slant face (144b) in place of said horizontal face (143b). Therefore, cable slackening can be done in one action. Namely, after said cable is held in a tensioned state by means of the axial movement of said adjusting pipe (11) by applying a load P to said adjusting piece, when said load P is released, said adjusting piece (13) ascends by virtue of said spring (15) making said projection (13c) reach said straight groove (14a) at once through sliding said projection (13c) along said declined face (144b) of said declined groove (14b). Then, while said projection (13c) slides along said declined face (144b), the cable is slackened due to the movement of said adjusting pipe (11) in direction "f".

Figure 60:
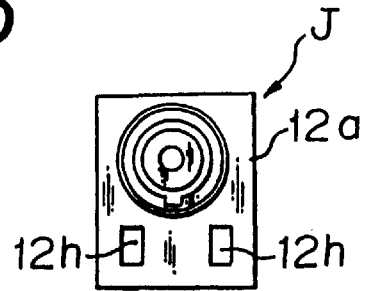
FIG. 60 is a left-side view of FIG. 58.
Figure 61:
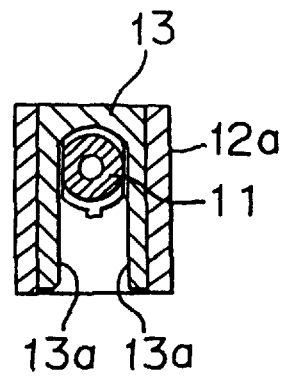
FIG. 61 is a sectional view along line 61—61 in FIG. 58.

In FIGS. 58 through 65, Device J, the 9th embodiment of the present invention is shown. In said Device J, rectangular windows to restrict the movement of an adjusting piece (13) are provided at the lower and upper sides of a base member (12). Namely, at the upper portion of one side of a rectangular cylindrical portion (12a) of said base member are formed rectangular windows (12g and 12g) (FIG. 59), and at the lower portion of the other side are rectangular windows (12h and 12h) (FIG. 60).

Figure 62:
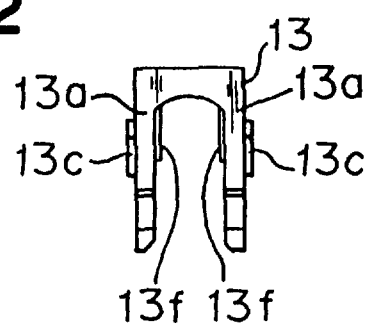
FIG. 62 is a front view of an adjusting piece in FIG. 58.
Figure 63:
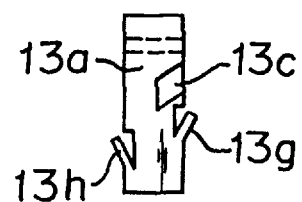
FIG. 63 is a side view of FIG. 62.

As shown in FIGS. 62 and 63, lozenge projections (13c and 13c) are formed outside both of the opposing side plates of said adjusting piece (13), and locking teeth (13f)to engage with latching teeth (11a) of an adjusting pipe (11) is formed on the inside of each of said opposing sides plates (13a), and on the edge side thereof an upper tongue (13g) and lower tongue (13h) are formed. And, as is the case with the preceding embodiment, said adjusting piece is inserted into said rectangular cylindrical portion (12a) of said base member (12).

Such insertion is exerted by descending said lozenge projection (13c) along a guide groove (140) provided on the inside wall of said rectangular cylindrical portion (12a). In this case, as shown in FIGS. 64 and 65, an upper straight groove (140a) is continuously connected to a lower straight groove (140b) through a declined groove (140c) to form said guide groove (140).

Figure 64:
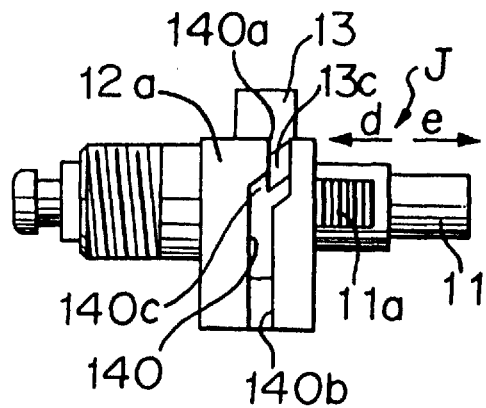
FIG. 64 is a front view to explain the functions of the embodiment in FIG. 58.
Figure 65:
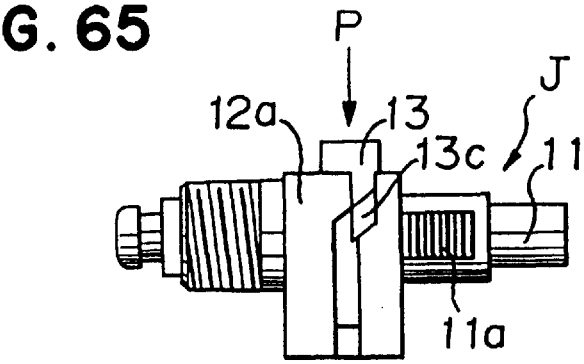
FIG. 65 is a front view to explain the functions of the embodiment in FIG. 58.

Directly after said insertion has been performed, said Device J is in the state, as shown in FIG. 64, wherein slipping off is prevented by engagement of said upper tongue (13g) with said rectangular window (12g). In said state, said adjusting pipe (11) can move both in direction "d" and direction "e" (FIG. 64), since locking teeth (13f)of said adjusting piece (13) are free from engagement with said teeth (11a) of said adjusting pipe (11). After tensioning a cable by the movement of said adjusting pipe (11), said adjusting piece (13) is descended by a load P to abut said projection (13c) to the declined face of said declined groove (140) (refer to FIG. 65). In this situation, half of said locking teeth (13f)of said adjusting piece (13) are engaged with said latching teeth (11a) of said adjusting pipe (11) to lock the axial movement thereof, preserving the tensioned state of said cable.

Figure 66:
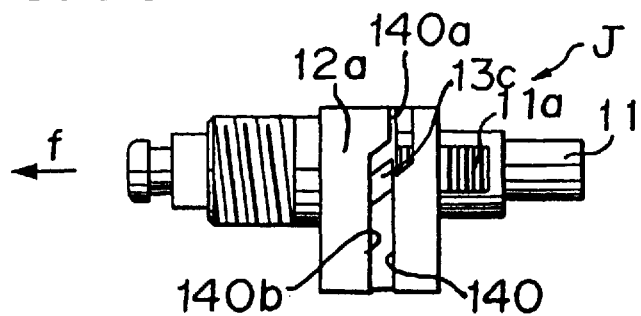
FIG. 66 is a front view to explain the functions of the embodiment in FIG. 58.

When descending said adjusting piece (13) by a load P, said projection (13c) will slide along said declined groove (140c) down to said lower straight groove slantly towards the axial direction of said adjusting pipe (11) (refer to FIG. 66). Due to such slant movement of said adjusting piece (13), said adjusting pipe (11) moves in direction "f", slackening said cable. Thus, said cable can be held somewhat in slackened state, since the slippage of said adjusting piece (13) is prevented by engaging such lower tongue (13h) with said lower rectangular window (12h), and at the same time, the axial movement of said adjusting pipe (11) is locked, by said locking teeth (13f)all being engaged with said latching teeth (11a).

Figure 67:
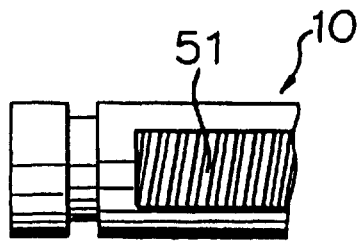
FIG. 67 is a partial side view of an adjusting pipe of the 10th embodiment of the present invention.
Figure 68:
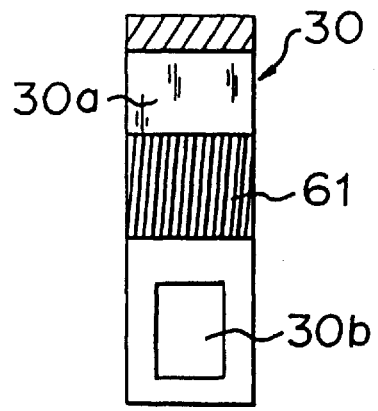
FIG. 68 is a partial sectional view of an adjusting piece in the 10th embodiment of the present invention.
Figure 69:
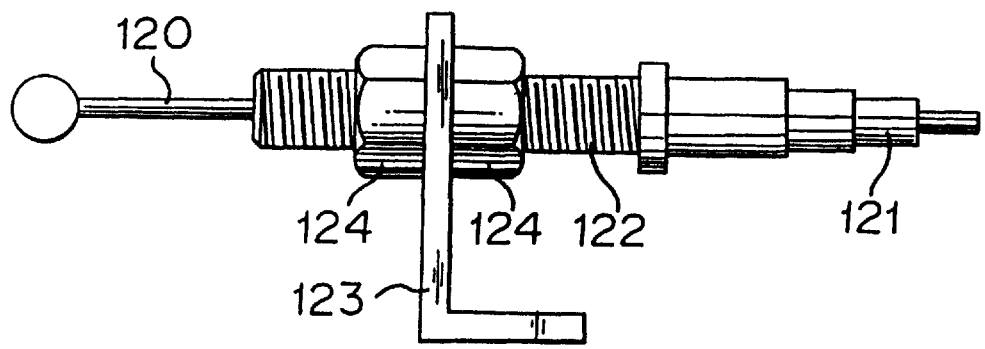
FIG. 69 is a front view of an adjusting device pursuant to a prior art.

FIGS. 67 and 68 show an adjusting pipe and an adjusting piece of an Adjusting Device K as an adjusting type of the slacking of a control cable. Said Device K comprises the same structures and elements as said Device B, except for the locking teeth structure. The same numerals are therefore used for the same elements.

In Device K, said latching teeth (51) are, as shown in FIG. 67, slantly formed on both sides of said adjusting pipe (10), to the axial direction thereof. Said locking teeth (61) are formed slantly on the opposing faces of said opposing side plates (30a) of said adjusting piece (30), as shown in FIG. 68, in correspondence with said latching teeth (51).

The movement of said adjusting pipe (10) is locked by the engagement of said latching teeth (51) with said locking teeth (61), and under such engagement, said adjusting pipe (10) moves along the axial direction thereof when moving said adjusting piece (30) rectangularly to said axial direction. Therefore, in Device K, after tensioning and adjusting the length of a control cable by moving said adjusting pipe (10) due to releasing said engagement of said latching teeth (51) with locking teeth (61), said adjusting piece (30) is moved towards the reverse direction for engaging said latching teeth (61) again with said locking teeth (51), and when moved further, said adjusting pipe (10) is locked in a somewhat slackened position, resulting in positioning in a somewhat slackened state.

As described above, any device according to the present invention, shortening the operation stroke of an adjusting piece, can make the whole size compact and thus save on installation space, in comparison with other prior arts. Secured locking is attained because latching teeth and locking teeth, both engraved in parallel, are engaged together.

Further, as the movement range of an adjusting piece is restricted by a concave formed within an adjusting pipe, the slippage of a base member from said adjusting pipe is prevented, which leads to easy assembly. Further, when latching teeth on an adjusting pipe are formed into circular grooves, said adjusting pipe becomes pivotal even when locked, which automatically stops cable twisting after length djustment thereof.

Further, a guide groove provided in an adjusting piece will make the length adjustment very simple in one action and secure maintenance of a defined length of control cable even when exposed to external force. Further, when a groove which receives the projection of an adjusting pipe is formed in a penetrating hole of a base member, said adjusting pipe can be assembled into said base member movably only in the axial direction thereof, resulting in easy positioning and a decrease in the number of assembly steps.

Since a device pursuant to the present invention is assembled by inserting an adjusting piece into a base member into which an adjusting pipe is inserted, it is easy to assemble said device which is simple in structure, having less parts, and accordingly, low manufacturing costs.

What is claimed is:

1. In combination, a length-adjusting device for a control cable, comprising:

a stationary base member with an outer cable (a) or an inner cable (b) of said control cable being fixedly secured thereto, and into which a cylindrical adjusting pipe having circular grooves formed and disposed thereon in parallel is inserted so as to be moveable in an axial direction thereof;

an adjusting piece, having a resilient spring, and having a pair of similarly pitched locking teeth for engagement to and release from said circular grooves, which is moveably inserted in a direction perpendicular to the axis of said adjusting pipe and into an aperture in said stationary base member; and wherein said adjusting piece is biased by said resilient spring disposed between said stationary base member and said adjusting piece, for engaging said circular grooves with said locking teeth, and at the same time enabling the release of said engagement by movement against the resilient force of said resilient spring by means of an external force, and wherein said adjusting piece having opposing side plates provided with latching windows at their ends for engagement with corresponding latching elements provided on a pair of oppositely disposed side plates of said stationary base member.

* * * * *

UNITED STATES PATENT AND TRADEMARK OFFICE
CERTIFICATE OF CORRECTION

PATENT NO.   : 5,850,763
DATED        : December 22, 1998
INVENTOR(S)  : Yoshiharu Kitamura It is certified that error appears in the above-identified patent and that said Letters Patent is hereby corrected as shown below:

<u>Title page,</u>
Item [73], Assignees, change "HNK" to -- NHK --

Signed and Sealed this

Sixteenth Day of July, 2002

*Attest:*

*Attesting Officer*

JAMES E. ROGAN
*Director of the United States Patent and Trademark Office*